United States Patent Office 2,863,702
Patented Dec. 9, 1958

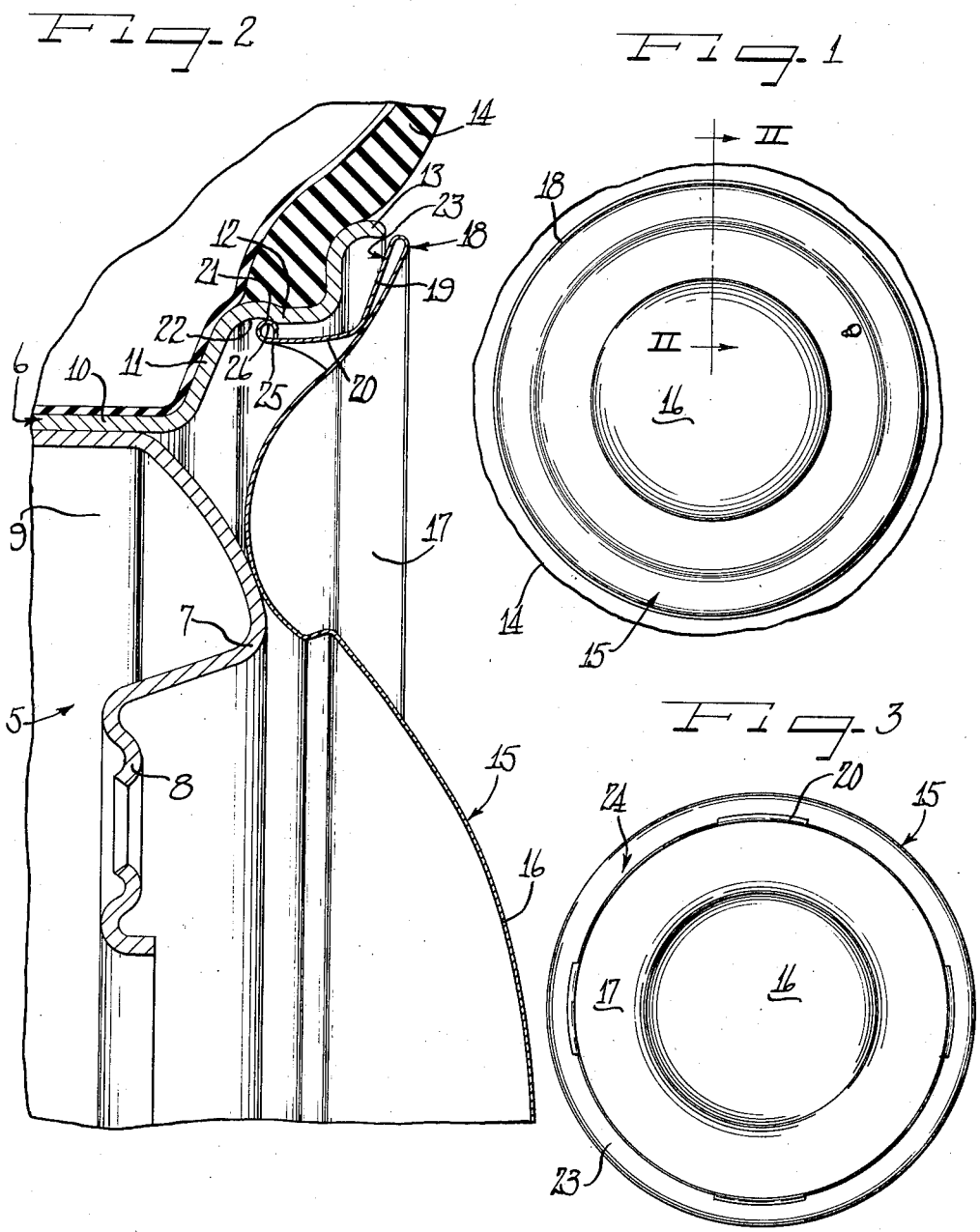

2,863,702
WHEEL COVER
George Albert Lyon, Detroit, Mich.
Application April 6, 1955, Serial No. 499,582
7 Claims. (Cl. 301—37)

The present invention relates to improvements in wheel structures and more particularly concerns improvements in the ornamentation and protection of the outer sides of vehicle wheels such as automobile wheels.

An important object of the present invention is to provide a wheel structure having an improved cover.

Another object of the invention is to provide a cover having improved means for maintaining the cover structure on the wheel.

A further object of the invention is to provide a self-retaining wheel cover which is readily adaptable to manufacturing variables in axial disposition of the wheel components and in which in addition to being effectively self-retaining is substantially shock resistant and vibration-proof.

According to the general features of the invention there is provided in a cover for a wheel including a multi-flanged drop center tire rim and a supporting body member therefor and one of the members having radially projecting protuberance means, a circular dished wheel cover for telescoping nested engagement with one of the members having a peripheral turned margin provided with a generally axially rearwardly extending continuous circular axial flange generally parallel to the axial rim flange and spaced therefrom, the axial flange having arcuately curved spaced cut way sections alternating with rearwardly extending arcuately curved yieldable cover retaining portions, each of the portions terminating in a radially turned stiff edge and being of relatively narrow width in a radial direction, each of the flange portions being resiliently yieldable rearwardly of the margin in a radial direction upon its stiff edge engaging one of said wheel members and when thus stressed applying resilient pressure to wedge the edge in resilient gripping engagement with the protuberance means.

Other objects, features and advantages of the present invention will be readily apparent from the following detailed description of a preferred embodiment thereof taken in conjunction with the accompanying drawings, wherein:

Figure 1 is a side elevational view of a vehicle wheel embodying the features of the present invention;

Figure 2 is an enlarged radial sectional view taken substantially on the line II—II of Figure 1; and Figure 3 is a rear elevational view of a wheel cover showing the spaced relationship between the retaining members.

As shown on the drawings:

A vehicle wheel with which the present invention is adapted to be used may be of more or less the conventional style including a wheel body 5 and a tire rim 6. The wheel body may be formed as a sheet metal pressed member including an axially outwardly protruding annular nose bulge 7 defining at its inner side a dished bolt-on flange 8. At its outer margin the wheel body includes a generally axially inwardly extending flange 9 by which it is secured in suitable manner as by welding, riveting or the like to a base flange 10 of the tire rim. From the base flange of the tire rim extends a side flange 11 which merges with an intermediate generally axially outwardly extending flange 12 and which in turn merges with a terminal flange 13. The multi-flange drop center tire rim member is adapted to support a pneumatic tire and tube assembly 14.

For protectively and ornamentally covering the outer side of the vehicle wheel a novel wheel cover 15, preferably made from stainless steel, is provided. This wheel cover comprises a central hub cap simulating crowned portion 16, an intermediate annular portion or member 17 and a peripheral turned looped outer terminal margin 18. The wheel cover 15 is adapted to be carried by the tire rim 6 in telescoping nested engagement as hereinafter related.

The magnitude and extent of the annular member 17 is such that it substantially covers the tire rim 6. At its outer margin the annular portion 17 is integral with the outer marginal annular member 18.

Extending generally radially inwardly and slightly axially inwardly integrally from the outer margin of the portion 18 is a relatively long substantially frusto-conical flange 19 which serves as a backing for the margin of the annular portion 17 and retains the annular margin on a substantially convex curvature while the remainder of the annular portion inwardly from its outer margin is concave. The extent of the radial flange 19 is substantially from the extremity of the terminal flange 13 of the tire rim inwardly substantially beyond the axially extending plane of the intermediate flange 12.

For retaining the cover on the wheel, the inner margin of the retaining ring flange 19 is provided with a series of generally axially inwardly extending resilient retaining fingers or cover retaining portions 20 which are preferably tabs or strips which extend inwardly to a sufficient distance so that when the cover is fully assembled on the wheel, the inner end portions of the resilient fingers 20 will be opposite substantially the central portion of the tire rim intermediate flange 12. Here the intermediate flange 12 is provided with a generally radially and axially inwardly facing annular shoulder or protuberance 21 defining the axially outer side of a radially inwardly opening groove or notch 22 in the base portion of the intermediate flange.

It will be noted from Figure 2 that the outer margin 18 is turned under forming a member 23 of L-shaped cross section with a radial leg comprising a flange 19 and an axial leg comprising a flange embodying fingers 20 and with the junction of the legs bottomed on the back surface of the cover margin radially inwardly of the looped turned under peripheral edge of the cover to back up and rigidify same. In Figure 3 it will be noted that the axial leg or flange 20 has arcuately curved spaced cut away sections 24 alternating with the rearwardly extending arcuately curved yieldable terminals 25 of cover retaining portions 20.

Directed generally radially outwardly and axially outwardly from the terminal portions of the fingers 20 are retaining terminals 26 which may comprise short radius, fairly tight stiff bead-like curls or edges that will engage and bottom in strong gripping, snap-on, pry-off wedging retaining relation rearwardly against and behind the inwardly facing shoulder or protuberance 21. The resilience of the long fingers 20 promotes thorough and uniform engagement of all of the retaining terminals 26 with the shoulder 21, irrespective of manufacturing inaccuracies therein which may leave the radially inwardly facing surface thereof with some eccentricity. Furthermore, the resilient fingers 20 afford a substantially floating retention and support for the cover which is yieldable in response to curbing or like pressure against the looped marginal member 18.

Furthermore, the resilient fingers 20 are advantageous in permitting convenient pry-off of the looped margin 18 and thus of the cover when desired since a pry-off tool can conveniently be interposed between the outer margin of the portion 18 and the terminal flange 13 of the tire rim and pry-off force applied to remove the cover. In applying the pry-off force, the fingers 20 yield, especially at the side of the cover opposite from that at which the pry-off force is applied so that the fingers immediately adjacent the pry-off tool are relieved of their retaining tensioning engagement with the intermediate flange 12 of the tire rim and thus can be snapped outwardly from the shoulder 21 and slidably freed from the intermediate flange 12. It may be necessary to apply the pry-off force at a succession of points around the wheel cover but the cover will quickly be dislodged responsive to such pry-off force. On the other hand, even severe service conditions such as jarring or bumping or curbing or other pressures applied thereto will not dislodge the cover.

In applying the cover to the wheel, it is generally centered with respect to the wheel and axially inward pressure applied to the looped annular portion 18 to force the same axially inwardly and more particularly to force the retaining fingers 20 and the retaining terminals 21 slidably axially inwardly along the inner surface of the intermediate flange 12 until the cover is entirely in place on the wheel.

In the fully mounted position of the cover, the intermediate annular portion 17 seats against the nose bulge 7 and is maintained under slight tension so that a firm engagement thereof with the nose bulge is retained and the central crowned portion 16 of the cover is supported in vibration-free spaced relation to the nose bulge 7. However curbing or other force against the central portion 16 is yieldably resisted by the resiliency of the intermediate annular portion 17 which allows a certain amount of resilient transverse movement as well as axial movement of the crown portion in response to force applied thereto.

This application is a continuation-in-part of my application Serial No. 275,871 filed March 11, 1952, now abandoned. The application 275,871 constituted a continuation-in-part of my earlier application Serial No. 104,900 filed July 15, 1949, now abandoned.

It will be understood that modifications and variations may be effected without departing from the novel concepts of the present invention.

I claim as my invention:

1. In a cover for a wheel including a multi-flanged drop center tire rim member and a supporting body member therefor and one of said members having radially projecting protuberance means, a circular dished wheel cover for telescoping nested engagement with one of said members having a peripheral turned margin provided with a generally axially rearwardly extending continuous circular axial flange having arcuately curved spaced cut-away sections alternating with rearwardly extending arcuately curved yieldable cover retaining portions, said flange being engaged and bottomed at one end on said margin generally opposite the protuberance means to minimize axial movement of the cover and retaining portions while in assembly with the wheel and with the generally circular flange extending generally parallel to said axial rim flange and spaced therefrom, each of said retaining portions terminating in a radially turned stiff edge and being of relatively narrow width in a radial direction, each of said retaining portions being resiliently yieldable rearwardly of said margin in a radial direction upon its stiff edge engaging one of said wheel members and when thus stressed applying resilient pressure to wedge said edge in resilient gripping engagement with said protuberance means.

2. In a cover for a wheel including a multi-flanged drop center tire rim member and a supporting body member therefor and one of said members having radially projecting shoulder means, a circular dished wheel cover for telescoping nested engagement with one of said members having a peripheral turned margin provided with a generally axially rearwardly extending continuous circular axial flange having arcuately curved spaced cut-away sections alternating with rearwardly extending arcuately curved yieldable cover retaining portions, said flange being engaged and bottomed at one end on said margin generally opposite the protuberance means to minimize axial movement of the cover and retaining portions while in assembly with the wheel and with the generally circular flange extending generally parallel to said axial rim flange and spaced therefrom, each of said retaining portions terminating in a radially turned stiff edge and being of relatively narrow width in a radial direction, each of said retaining portions being resiliently yieldable rearwardly of said margin in a radial direction upon its stiff edge engaging one of said wheel members and when thus stressed applying resilient pressure to wedge said edge in resilient gripping engagement with said shoulder means.

3. In a cover for a wheel including a multi-flanged drop center tire rim member and a supporting body member therefor and one of said members having radially projecting shoulder means, a circular dished wheel cover for telescoping nested engagement with one of said members having a peripheral turned outer marginal portion connected to an annular portion connected to but spaced axially from said margin with a free end backing up and reinforcing said margin, said annular portion being bottomed against the wheel in generally axial alignment with the shoulder means provided with a generally axially rearwardly extending continuous circular axial flange generally parallel to said axial rim flange and spaced therefrom, said axial flange having rearwardly extending arcuately curved yieldable cover retaining portions, each of said portions terminating in a radially turned stiff edge and being of relatively narrow width in a radial direction, each of said flange portions being resiliently yieldable rearwardly of said margin in a radial direction upon its stiff edge engaging one of said wheel members and when thus stressed applying resilient pressure to wedge said edge in resilient gripping engagement with said shoulder means, said axial flange and free end being urged against said cover margin at a spaced distance from the connection of said annular portion with said marginal portion to back up and rigidify same.

4. In a cover for a wheel including a drop center tire rim member and a supporting body member therefor and one of said members having radially projecting protuberance means, a circular dished cover for telescoping nested engagement with one of said members having a peripheral turned margin with a generally radially inwardly extending flange connected to a generally axially rearwardly extending flange generally parallel to said axial rim flange and spaced therefrom, said axial flange having arcuately curved spaced cut away sections alternating with rearwardly extending arcuately curved yieldable cover retaining portions, each of said portions terminating in a radially turned stiff edge and being of relatively short dimension in a radial direction, each of said flange portions being resiliently yieldable rearwardly of said margin in a radial direction upon its stiff edge engaging one of said wheel members and when thus stressed applying resilient pressure to wedge said edge in resilient gripping snap on snap off engagement with said protuberance means, the junction of said radially inwardly extending flange with said axially rearwardly extending flange being bottomed against said cover margin to back up and reinforce same, with said edge flexing from said junction when engaged with said protuberance means.

5. In a cover for a wheel including a multi-flanged drop center tire rim member and a supporting body member therefor and one of said members having radially projecting shoulder means, a circular cover member for overlying disposition upon the wheel having an annular concave portion extending radially inward of and leading into a convexly curved outer cover margin, said margin having a turned under cover retaining and curved back up portion including a first leg underlying but spaced from said margin substantially through its length and having an end portion bottomed against said margin generally axially opposite the shoulder means to back up the convex curvature of said margin and a second generally axially inwardly extending leg joined with said end portion of said first leg, said second leg having spaced cut-away sections alternating with axially rearwardly extending yieldable cover retaining portions including a radially turned stiff edge being resiliently yieldable rearwardly of said margin in a radial direction upon its stiff edge engaging one of said wheel members and when thus stress applying resilient pressure to wedge said edge in resilient gripping engagement with said shoulder means.

6. In a wheel structure, a wheel including rim and body parts with the rim having a radially inwardly facing rim shoulder, a cover including a cover margin for overlying disposition upon the wheel and having an annular flap turned under from an outer edge of the cover margin with the flap through its major dimension being rearwardly spaced from but inclined radially inwardly toward the cover margin, said radially inwardly inclined flap having flap portions bottomed against the underside of the cover margin a distance substantially radially inwardly of the outer edge generally axially opposite the rim shoulder, said flap having a plurality of generally axially inwardly extending resiliently yieldable cover retaining extensions arranged in a common circle having a diameter normally slightly at variance with the radially inwardly facing rim shoulder, said extensions being connected at their axially outer ends to said flap portions bottomed against the underside of the cover at a distance substantially radially inwardly of the outer cover edge generally axially opposite the rim shoulder with said extensions being thereby backed up to resist axial displacement of the extension with respect to the rim shoulder when in retained engagement with the wheel, said extensions also being resiliently yieldable radially back and forth about the backed-up junction of the extensions and flap with respect to the cover margin.

7. In a wheel structure, a wheel including rim and body parts with the rim having a radially inwardly facing rim surface, a cover including a cover margin for overlying disposition upon the wheel and having an annular flap turned under from an outer edge of the cover margin with the flap through its major dimension being rearwardly spaced from but inclined radially inwardly toward the cover margin, said radially inwardly inclined flap having flap portions bottomed against the underside of the cover margin a distance substantially radially inwardly of the outer edge generally axially opposite the radially inwardly facing rim surface, said flap having a plurality of generally axially inwardly extending resiliently yieldable cover retaining extensions arranged in a common circle having a diameter normally slightly at variance with the radially inwardly facing rim surface, said extensions being connected at their axially outer ends to said flap portions bottomed against the underside of the cover at a distance substantially radially inwardly of the outer cover edge generally axially opposite the radially facing rim surface with said extensions being thereby backed up to resist axial displacement of the extension with respect to the radially facing rim surface when in retained engagement with the wheel, said extensions also being resiliently yieldable radially back and forth about the backed-up junction of the extensions and flap with respect to the cover margin, said cover having a dished portion disposed generally inwardly of the junction of the extensions with the cover margin and with said dished portion including a radially and axially inwardly facing surface sealed against the body part thereby fixedly positioning the flexible extensions with respect to the wheel to resist radial displacement of the extensions with respect to the rim surface engaged by said extensions under resilient tension.

References Cited in the file of this patent
UNITED STATES PATENTS

| | | |
|---|---|---|
| 2,368,228 | Lyon | Jan. 30, 1945 |
| 2,440,638 | Lyon | Apr. 27, 1948 |
| 2,561,160 | Weasler | July 17, 1951 |
| 2,669,487 | Horn | Feb. 16, 1954 |